US010822482B2

United States Patent
Hamabe et al.

(10) Patent No.: US 10,822,482 B2
(45) Date of Patent: *Nov. 3, 2020

(54) COMPOSITE RESIN COMPOSITION

(71) Applicant: PANASONIC CORPORATION, Kadoma (JP)

(72) Inventors: Masashi Hamabe, Osaka (JP); Toshifumi Nagino, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 64 days.

This patent is subject to a terminal disclaimer.

(21) Appl. No.: 15/817,879

(22) Filed: Nov. 20, 2017

(65) Prior Publication Data

US 2018/0201770 A1 Jul. 19, 2018

(30) Foreign Application Priority Data

Jan. 18, 2017 (JP) ................. 2017-006294

(51) Int. Cl.
*C08L 23/12* (2006.01)
*C08J 5/04* (2006.01)

(52) U.S. Cl.
CPC .............. *C08L 23/12* (2013.01); *C08J 5/045* (2013.01); *C08J 2323/02* (2013.01); *C08J 2323/12* (2013.01)

(58) Field of Classification Search
CPC .................. C08L 23/12; C08J 5/045
See application file for complete search history.

(56) References Cited

U.S. PATENT DOCUMENTS

| 4,552,805 A | 11/1985 | Fish et al. |
| 8,012,573 B2 | 9/2011 | Kowata et al. |
| 2009/0065975 A1* | 3/2009 | Sain ............... B27N 1/00 264/258 |

(Continued)

FOREIGN PATENT DOCUMENTS

| JP | 61-143440 A | 7/1986 |
| JP | 2012-102234 | 5/2012 |

(Continued)

OTHER PUBLICATIONS

Extended European Search Report, European Patent Application No. 18151799.6, dated Jun. 6, 2018 (7 pages).

(Continued)

*Primary Examiner* — John E Uselding
(74) *Attorney, Agent, or Firm* — Hamre, Schumann, Mueller & Larson, P.C.

(57) ABSTRACT

Provided is a composite resin composition to be used as a material for a molded article produced by a molding machine. The composite resin composition includes a main ingredient resin 1 and a fibrous filler 2, and the fiber length direction end of the fibrous filler 2 is defibrated. The length of the defibrated portion 3 is 5% or more and 50% or less of the fiber length of the entire fibrous filler 2. The fiber diameter in the defibrated portion 3 of the fibrous filler 2 is $1/1000$ or more and $1/10$ or less the fiber diameter in the undefibrated portion. The modulus of elasticity of the fibrous filler 2 is higher than the modulus of elasticity of the main ingredient resin 1, and the difference between these moduli of elasticity is within 20 GPa.

8 Claims, 3 Drawing Sheets

(56) References Cited

U.S. PATENT DOCUMENTS

2012/0277351 A1  11/2012  Yano et al.
2015/0044461 A1   2/2015  Yokomizo et al.

FOREIGN PATENT DOCUMENTS

| JP | 5577176 | 8/2014 |
| JP | 2016-176055 | 10/2016 |
| WO | 2007/056839 | 5/2007 |
| WO | 2009/081881 | 7/2009 |
| WO | 2011/068023 | 6/2011 |
| WO | 2013/137246 A1 | 9/2013 |

OTHER PUBLICATIONS

Office Action issued for the Japanese Patent Application No. 2017-006294, dated Jun. 26, 2020, 8 pages including English translation.

\* cited by examiner

F I G. 4
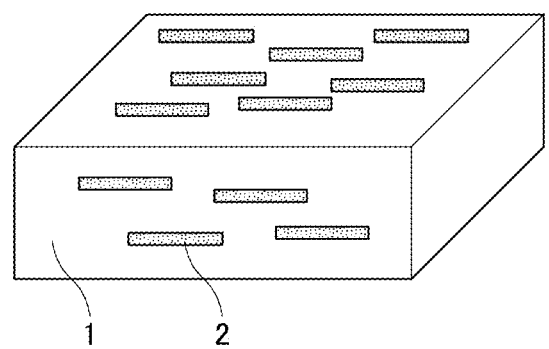
F I G. 5
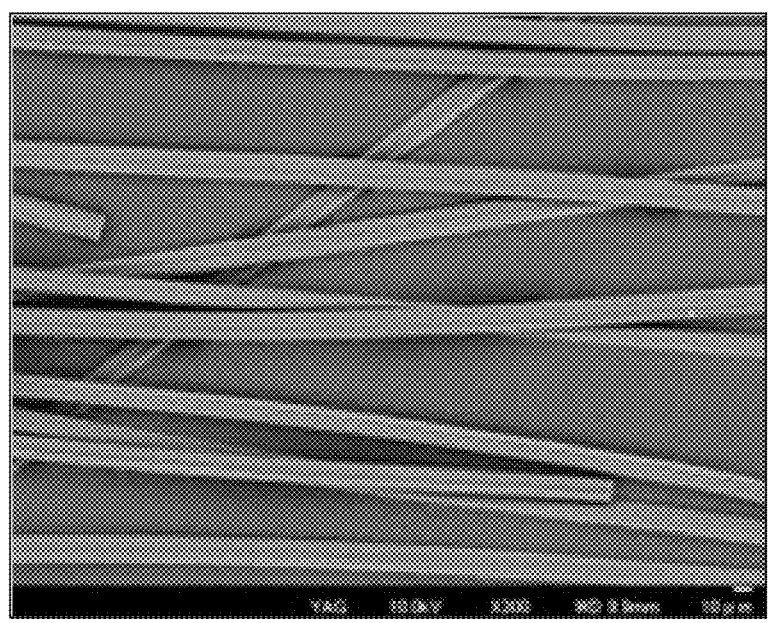

COMPOSITE RESIN COMPOSITION

FIELD OF THE INVENTION

The present invention relates to a composite resin composition capable of actualizing a molded body excellent in mechanical properties.

BACKGROUND OF THE INVENTION

So-called "general purpose plastics" such as polyethylene (PE), polypropylene (PP), polystyrene (PS) and polyvinyl chloride (PVC) are very inexpensive, and additionally easy in molding, and as light in weight as a fraction of the weight of a metal or a ceramic. Accordingly, general purpose plastics are in common use as the materials for various living goods such as bags, various packaged bodies, various containers, and sheets; industrial components such as automobile components and electrical components; and daily commodities and miscellaneous goods.

However, general purpose plastics have drawbacks such as insufficient mechanical strength. Therefore, general purpose plastics have no sufficient properties required for the materials used for various industrial products including mechanical products such as automobiles, and electric/electronic/information products, and as affairs now stand, the application scopes of general purpose plastics are limited.

On the other hand, so-called "engineering plastics" such as polycarbonate, fluororesin, acrylic resin and polyamide are excellent in mechanical properties, and are used for various industrial products including mechanical products such as automobiles, and electric/electronic/information products. However, engineering plastics are expensive, find difficulty in monomer recycling, and have a problem of causing a large environmental load.

Consequently, a drastic improvement of the material properties (such as mechanical strength) of general purpose plastics has been demanded. There has hitherto been known a technique in which for the purpose of reinforcing general purpose plastics, fibrous fillers such as natural fibers, glass fibers and carbon fibers are dispersed in general purpose plastics, and thus, general purpose plastics are improved in mechanical strength. Among these, organic fibrous fillers such as cellulose are inexpensive, excellent in environmental friendliness, and accordingly have been attracting attention as reinforcing fibers.

For the purpose of improving the mechanical strength of general purpose plastics, various companies have proceeded with studies; in Patent Document 1, the modulus of elasticity and the dimensional stability have been improved by adding a cellulose fiber having a maximum fiber diameter of 100 nm or less and an aspect ratio of 2000 or more.

Patent Document 1: Japanese Patent No. 5577176

However, in Japanese Patent No. 5577176, a fiber having an aspect ratio of 2000 or more is added, and as shown in FIGS. 4 and 5, fibers 2 tend to be oriented in the flow direction of the main ingredient resin 1 in a molten state, extruded during molding, and accordingly, the strength in the direction perpendicular to the flow direction is weak, and in particular, there is a problem of the decrease of the surface impact strength.

DISCLOSURE OF THE INVENTION

The present invention solves the above-described conventional problems, and an object of the present invention is to actualize a composite resin composition capable of obtaining a composite resin molded body having a high modulus of elasticity and a high impact resistance.

In order to achieve the above-described object, the composite resin composition of the present invention is a composite resin composition to be used as a material for a molded article produced by a molding machine, and includes a main ingredient resin and a fibrous filler, wherein the fiber length direction end of the fibrous filler is defibrated, the length of the defibrated portion is 5% or more and 50% or less of the fiber length of the entire fibrous filler, the fiber diameter in the defibrated portion of the fibrous filler is $1/1000$ or more and $1/10$ or less the fiber diameter in the undefibrated portion of the fibrous filler, the modulus of elasticity of the fibrous filler is higher than the modulus of elasticity of the main ingredient resin, and the difference between these moduli of elasticity is within 20 GPa.

According to the present invention, a composite resin composition having a high modulus of elasticity and a high impact resistance can be actualized.

BRIEF DESCRIPTION OF THE DRAWINGS

FIG. 4 is a schematic view of the composite resin molded body in Japanese Patent No. 5577176; and FIG. 5 is a view showing an enlarged detail of a portion of FIG. 4.

DESCRIPTION OF THE EMBODIMENT

Hereinafter, the composite resin composition in an embodiment of the present invention is described with reference to the accompanying drawings. It is to be noted that, in the following description, the same constituent portions are denoted by the same reference signs, and the detailed description of such portions is sometimes appropriately omitted.

Figure 1:
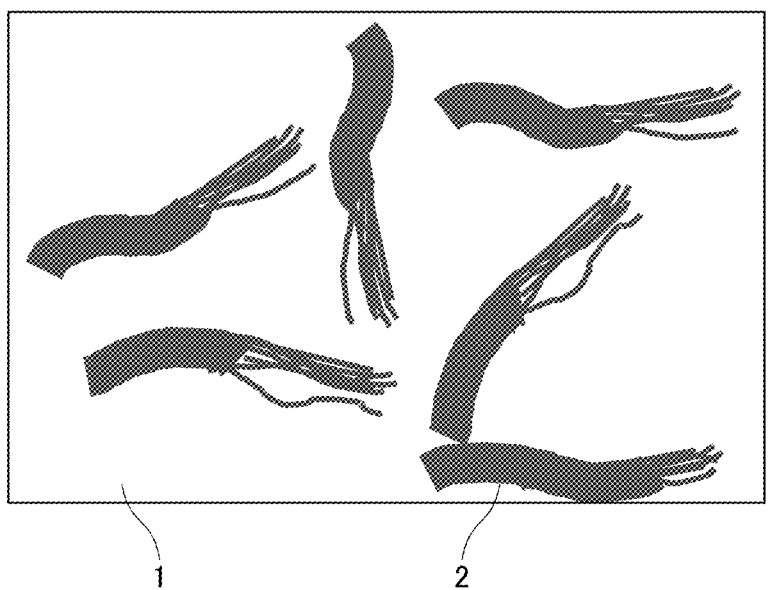
FIG. 1 is a schematic cross-sectional view of the composite resin composition in an embodiment of the present invention.

The composite resin composition in an embodiment of the present invention is produced from a melt-kneaded product including a main ingredient resin, a fibrous filler and a dispersant. As shown in the schematic cross-sectional view of FIG. 1, in the composite resin composition, the fibrous filler 2 is dispersed in the main ingredient resin 1. The fibrous filler 2 is carbonized in a specific proportion.

In the present embodiment, the main ingredient resin 1 is preferably a thermoplastic resin, in order to secure a satisfactory moldability. Examples of the thermoplastic resin include: olefin-based resins (inclusive of cyclic olefin-based resins), styrene-based resins, (meth)acrylic resins, organic acid vinyl ester-based resins and the derivatives thereof, vinyl ether-based resins, halogen-containing resins, polycarbonate-based resins, polyester-based resins, polyamide-based resins, thermoplastic polyurethane resins, polysulfone-based resins (such as polyether sulfone and polysulfone), polyphenylene ether-based resins (such as a polymer of 2,6-xylenol), cellulose derivatives (such as cellulose esters, cellulose carbamates and cellulose ethers), silicone resins (such as polydimethylsiloxane and polymethylphenylsiloxane), and rubbers or elastomers (such as diene-based rubbers such as polybutadiene/polyisoprene, styrene-butadiene copolymer, acrylonitrile-butadiene copolymer, acrylic rubber, urethane rubber and silicone rubber). The above-described resins may be used each alone or in combinations of two or more thereof. It is to be noted that the thermoplastic resin used as the main ingredient resin 1 is not limited to the above-described materials as long as the resin used as the main ingredient resin 1 has thermoplasticity.

The main ingredient resin 1 is preferably one of the olefin-based resins, each having a relatively low melting point, among these thermoplastic resins. The olefin-based resins include, in addition to homopolymers of olefin-based monomers, copolymers of olefin-based monomers, and copolymers between olefin-based monomers and other copolymerizable monomers. Examples of the olefin-based monomer include: chain olefins (such as $\alpha$-C2-20 olefins such as ethylene, propylene, 1-butene, isobutene, 1-pentene, 4-methyl-1-pentene, and 1-octene), and cyclic olefins. These olefin-based monomers may be used each alone or in combinations of two or more thereof.

Among the aforementioned olefin-based monomers, chain olefins such as ethylene and propylene are preferable.

Examples of the other copolymerizable monomers include: fatty acid vinyl esters such as vinyl acetate and vinyl propionate; (meth)acrylic monomers such as (meth)acrylic acid, alkyl (meth)acrylates, and glycidyl (meth)acrylate; unsaturated dicarboxylic acids and anhydrides thereof such as maleic acid, fumaric acid, and maleic anhydride; vinyl esters of carboxylic acids (such as vinyl acetate and vinyl propionate); cyclic olefins such as norbornene and cyclopentadiene; and dienes such as butadiene and isoprene. These copolymerizable monomers may be used each alone or in combinations of two or more thereof. Specific examples of the olefin-based resin include polyethylene (such as low-density, intermediate-density, high-density or linear low-density polyethylene), polypropylene, ethylene-propylene copolymer, and chain olefins (in particular, $\alpha$-C2-4 olefin) such as ternary copolymers such as ethylene-propylene-butene-1.

The dispersant is described. The composite resin composition in the present embodiment includes a dispersant, for example, for the purpose of improving the adhesion between the fibrous filler 2 and the main ingredient resin 1, or for the purpose of improving the dispersibility of the fibrous filler 2 in the main ingredient resin 1. Examples of the dispersant include: various titanate-based coupling agents; silane coupling agents; modified polyolefins grafted with unsaturated carboxylic acids, maleic acid, or maleic anhydride; fatty acids; fatty acid metal salts; and fatty acid esters. The silane coupling agents are preferably unsaturated hydrocarbon based silane coupling agents or epoxy-based silane coupling agents. The surface of the dispersant may be subjected to a modification treatment with a thermosetting or thermoplastic polymer component without causing any problem. The content of the dispersant in the composite resin molded body in the present embodiment is preferably 0.01% by mass or more and 20% by mass or less, more preferably 0.1% by mass or more and 10% by mass or less, and furthermore preferably 0.5% by mass or more and 5% by mass or less. When the content of the dispersant is less than 0.01% by mass, dispersion failure tends to occur; on the other hand, when the content of the dispersant exceeds 20% by mass, the strength of the composite resin molded body tends to be decreased. The dispersant is appropriately selected on the basis of the combination of the main ingredient 1 and the fibrous filler 2. When the aforementioned combination does not require a dispersant, no dispersant may be added.

The fibrous filler 2 is described. The fibrous filler 2 included in the composite resin composition in the present embodiment is used mainly for the purpose of improving the mechanical properties or improving the dimensional stability due to the decrease of the linear expansion coefficient, in the resin molded body produced by using the composite resin composition. For that purpose, the fibrous filler 2 is required to be higher in modulus of elasticity than the main ingredient resin 1. Specific examples of the fibrous filler 2 include: carbon fiber; carbon nanotube; pulp; cellulose; cellulose nanofiber; lignocellulose; lignocellulose nanofiber; basic magnesium sulfate fiber (magnesium oxysulfate fiber); potassium titanate fiber; aluminum borate fiber; calcium silicate fiber; calcium carbonate fiber; silicon carbide fiber; wollastonite; xonotlite; various metal fibers; natural fibers such as cotton, silk, wool, and hemp; jute fiber; regenerated fiber such as rayon or cupra; semisynthetic fibers such as acetate and promix; synthetic fibers such as polyester, polyacrylonitrile, polyamide, aramid, and polyolefin; and modified fibers prepared by chemically modifying the surfaces and/or terminals of these fibers. Among these, from the viewpoint of availability, high modulus of elasticity, and low linear expansion coefficient, carbons and celluloses are particularly preferable. From the viewpoint of environmental friendliness, natural fibers such as celluloses are preferable.

Figure 2:
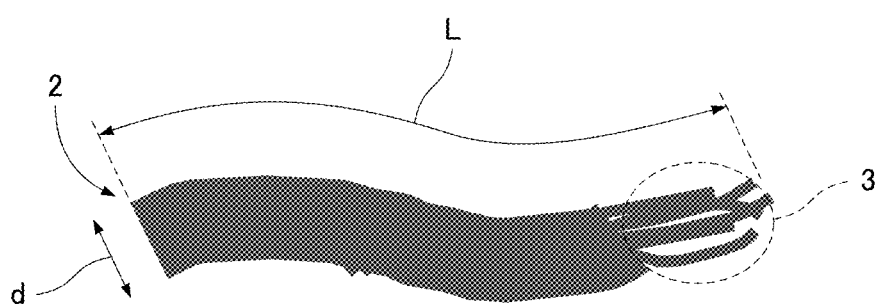
FIG. 2 is a schematic diagram of the fibrous filler in an embodiment of the present invention.

The shape of the fibrous filler 2 is described. FIG. 2 is a schematic diagram of the fibrous filler 2. The reference sign L denotes the length of the fibrous filler 2 (hereinafter, sometimes referred to as the "fiber length"). The reference sign d denotes the width of the fibrous filler 2 (hereinafter, sometimes referred to as the "fiber diameter"). When the aspect ratio (L/d) of the fibrous filler 2 is high, the fibers tend to be oriented in the flow direction during injection molding. Then, the strength in the orientation direction of the fibers is high, but the strength in the direction perpendicular to the orientation direction of the fibers is low, and consequently, the impact strength determined by, for example, falling test is decreased. Therefore, as the entire fiber, the small aspect ratio (L/d), namely, a large fiber diameter d is preferable. On the other hand, from the viewpoint of the mechanical properties, a large specific surface area of the fiber, namely, a small fiber diameter d is preferable because a large bonding interface between the fiber and the resin leads to the improvement of the strength.

In order to achieve the aforementioned two purposes, most preferable is a structure in which the fiber length direction end in one fiber is partially defibrated, as shown in FIG. 2. The reference sign 3 denotes the defibrated portion. The optimal shape of the fiber is calculated as follows from experiments and simulation results. The length of the defibrated portion 3 is required to be 5% or more and 50% or less of the fiber length L of the entire fibrous filler 2. When the length of the defibrated portion 3 is less than 5% of the fiber length L of the entire fibrous filler 2, the specific surface area is small and consequently the strength improvement is not recognized; when the length of the defibrated portion 3 is 50% or more of the fiber length L, the defibrated portions 3 having large aspect ratios prevail, accordingly the fibers tend to be easily oriented during injection molding, and the impact strength is decreased.

The fiber diameter in the defibrated portion 3 in the fibrous filler 2 is required to be $1/1000$ or more and $1/10$ or less the fiber diameter d in the undefibrated portion. When the fiber diameter in the defibrated portion is less than $1/1000$ the fiber diameter d of the undefibrated portion, the fiber diameter of the defibrated portion is too small, thus the defibrated portion is cut off due to the shear force during kneading, and accordingly it is difficult for the fibrous filler 2 to maintain the required shape. When the fiber diameter in the defibrated portion exceeds 1/10 the fiber diameter d of the undefibrated portion, the strength improvement effect due to the improvement of the specific surface area is small. The aspect ratio of the undefibrated portion (the portion large in fiber diameter) of the fibrous filler 2 is preferably 5 or more and 1000 or less. When the aforementioned aspect ratio is less than 5, the reinforcement effect due to the fiber shape is small, and when the aforementioned aspect ratio is more than 1000, the fibers tend to be easily oriented during injection molding.

The properties of the fibrous filler 2 are described. The types of the main ingredient resin 1 and the fibrous filler 2 are as described above; when the fibrous filler 2 is too soft in relation to the main ingredient resin 1, namely, the modulus of elasticity of the fibrous filler 2 is too low, the composite resin composition is low as a whole in modulus of elasticity, and is consequently decreased in strength. On the other hand, when the fibrous filler 2 is too hard in relation to the main ingredient resin 1, namely, the modulus of elasticity of the fibrous filler 2 is too high, the impact wave generated at the time of application of impact to the composite resin composition is not propagated but is absorbed in the interface between the main ingredient resin 1 and the fibrous filler 2, thus cracks or crazes tend to be generated in the vicinity of the interface, and consequently, the impact resistance strength of the composite resin composition is decreased. For that reason, the relation between the modulus of elasticity of the main ingredient resin 1 and the modulus of elasticity of the fibrous filler 2 is preferably such that the modulus of elasticity of the fibrous filler 2 is higher than the modulus of elasticity of the main ingredient resin 1, and the difference between these moduli of elasticity is as small as possible. The optimal relation is calculated from simulation results, and the difference of the modulus of elasticity between the main ingredient resin 1 and the fibrous filler 2 is required to fall within 20 GPa.

As the fibrous filler 2, there may be employed a fibrous filler subjected to a surface treatment for the purpose of improving the adhesiveness to the main ingredient resin 1 or the dispersibility in the composite resin composition. Examples of the surface treatment agent for that purpose include: various titanate-based coupling agents; silane coupling agents; modified polyolefin grafted with unsaturated carboxylic acids, maleic acid or maleic anhydride; fatty acids; metal salts of fatty acids; and fatty acid esters. Examples of the surface treatment agent for that purpose may also include thermosetting or thermoplastic polymer components.

Figure 3:
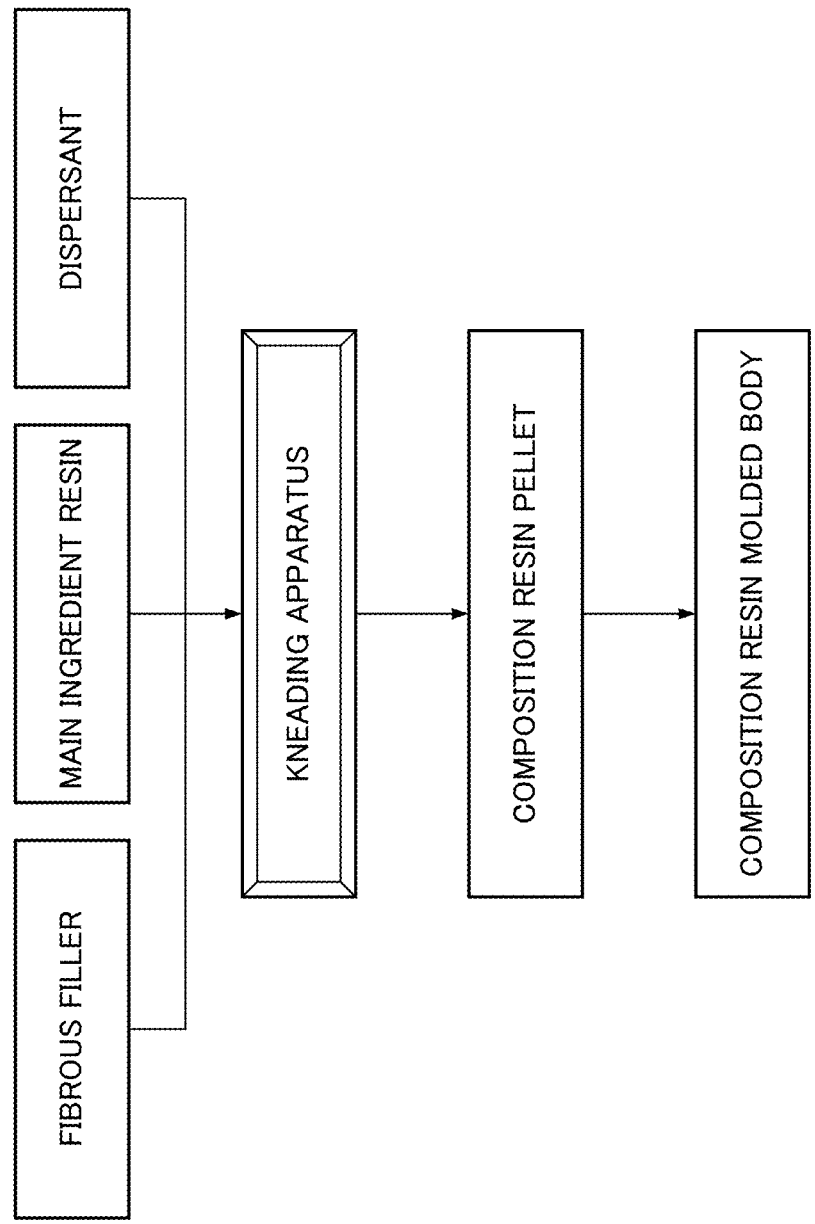
FIG. 3 is a flow chart showing the production process of the composite resin composition in an embodiment of the present invention.

A method for producing the composite resin composition of the present embodiment is described. FIG. 3 is a flow chart illustrating the production process of the composite resin composition of the present embodiment. First, in a melt-kneading treatment apparatus, the main ingredient resin, a fibrous filler, and, if necessary, a dispersant are placed, and melt-kneaded in the apparatus. Accordingly, the main ingredient resin is melted, and the fibrous filler and the dispersant are dispersed in the molten main ingredient resin. At the same time, due to the shear action of the apparatus, the defibration of the aggregates of the fibrous filler is promoted, and fibrous filler can be finely dispersed in the main ingredient resin.

As fibrous fillers, fibers preliminarily defibrated by a pretreatment such as wet dispersion have hitherto been used. However, when a fibrous filler is preliminarily defibrated in a solvent used for wet dispersion, the fibrous filler is more easily defibrated than in the molten main ingredient resin, and accordingly it is difficult to defibrate only the ends of the fibrous filler to result in a state in which the entire fibrous filler is defibrated. In addition, a combination of the pretreatment increases the number of steps, to cause a problem of the productivity degradation.

On the contrary, in the process for producing the composite resin composition of the present embodiment, the pretreatment based on the wet dispersion for the purpose of the defibration treatment or the modification treatment of the fibrous filler is not performed, but there is performed a melt-kneading treatment (entirely dry technique) in which the main ingredient resin, the fibrous filler, and a dispersant added if necessary are all together subjected to a melt-kneading treatment. In the aforementioned technique, because the wet dispersion treatment of the fibrous filler is not performed, the fibrous filler can be partially defibrated only in the ends thereof as described above, and the number of the steps is smaller to allow the productivity to be improved.

In the entirely dry technique, the fiber is not preliminarily modified, and mixed with the dispersant in the molten main ingredient resin, without modifying the entire fiber. Accordingly, partially there are sites in the fiber incompatible with the main ingredient resin, and such sites are incompatible with the main ingredient resin to form voids. When there are voids in the composite resin composition, the resin and the fiber are incompatible in such sites during the molding of a composite resin molded body, and the voids remain as they are. The voids slightly decrease the modulus of elasticity of the composite resin molded body, but improve the impact resistance of the composite resin molded body. Enclosures of household electric appliances, in particular, portable mobile household electric appliances such as vacuum cleaner cause problems of cracking during falling, and hence the improvement of the impact resistance is desired rather than the improvement of the modulus of elasticity. Accordingly, it is preferable to allow a moderate number of voids to be present in the composite resin composition, and to improve the impact resistance. The improvement of the impact resistance due to the voids is attributed to the relaxation, by the voids, of the impact wave propagated in the interface between the main ingredient resin and the fibrous filler during loading of the impact. The volume of the voids is calculated from the simulation results, and is preferably 10% or less of the volume of the fibrous filler.

The composite resin composition extruded from the melt-kneading apparatus is prepared in a pellet shape by a cutting step using a pelletizer or the like. Examples of the pelletizing method falling in a category of a method of pelletizing immediately after the melt extrusion of the resin include: a method of hot-cutting in air, a method of hot-cutting in water, and a strand cutting method. Alternatively, there may be quoted, for example, a crushing method in which after a molded body or a sheet is once molded, the molded body or the sheet is crushed and cut.

The pellet made of the composite resin composition prepared by the aforementioned pelletization is described. The pellet is molded into various composite resin molded bodies by passing through the following molding step. In the molding step, the composite resin composition intrudes into a kneader equipped with a screw(s) or a roll; depending on the shape of the screw(s) or roll, it is sometimes difficult for the pellet to be taken in. For the purpose of improving the intrudability of the pellet into the kneader of the molding apparatus, it is preferable for the pellet to have a nonuniform shape disturbing the rolling of the pellet. In the present embodiment, in the pelletizing step, it is possible to adopt a method for cutting without cooling to room temperature or lower. Accordingly, the cutting surface is extended so as to be torn off, the shape of the pellet is not cylindrical, but is a nonuniform shape in such a way that at least one end face is elliptical. As a result, the intrudability of the pellet into the kneader of the molding apparatus is improved.

When the pellet is torn off, the fibers inside the pellet partially protrude to the surface of the pellet, and consequently, asperities are formed on the surface of the pellet. By forming the shape having asperities on the surface of the pellet, as compared with a smooth spherical shape or a smooth cylindrical shape, the rolling of the pellet can be suppressed, and the intrudability of the pellet into the kneader of the molding apparatus is improved.

By injection molding the aforementioned pellet, an injection molded article as the composite resin molded body can be prepared. Because the fibrous filler has a structure in which only the ends of the fibrous filler are partially defibrated, as described above, the fibers are hardly oriented in the injection direction, and consequently, it is possible to obtain an injection molded article enhanced both in impact resistance and in modulus of elasticity.

EXAMPLES

Hereinafter, Examples and Comparative Examples based on the experiments performed by the present inventors are described.

Example 1

A pulp-dispersed polypropylene pellet was produced by the following production method.

A polypropylene (trade name: J108M, manufactured by Prime Polymer Co., Ltd.) as a main ingredient resin, a cotton-like softwood pulp (trade name: NBKP Celgar, manufactured by Mitsubishi Paper Mills Co., Ltd.) as a fibrous filler, and maleic anhydride (trade name: Umex, manufactured by Sanyo Chemical Industries, Ltd.) as a dispersant were weighed so as to give a mass ratio of polypropylene:cotton-like softwood pulp:maleic anhydride=85:15:5, and subjected to dry blending.

The softwood pulp having a modulus of elasticity of approximately 6 GPa, and the polypropylene having a modulus of elasticity of 1.5 GPa were used. The resulting mixture was melt-kneaded by using a twin-screw kneader (KRC kneader, manufactured by Kurimoto Ltd.), and thus the pulp was dispersed in the polypropylene. The shear force can be altered by changing the screw constitution of the twin-screw kneader; in Example 1, a specification of an intermediate shear type was adopted. The extruded resin melt was hot-cut, and thus, a pulp-dispersed polypropylene pellet (composite resin composition) was prepared.

By using the prepared pulp-dispersed polypropylene pellet, a specimen of the composite resin molded body was prepared with an injection molding machine (180AD, manufactured by The Japan Steel Works, Ltd.). The preparation conditions of the specimen were such that the molten resin temperature was set at 190° C., the mold temperature was set at 60° C., the injection speed was set at 60 mm/s, and the dwelling pressure was set at 80 Pa. The pellet was taken in the screws of the molding machine through the intermediary of the hopper, and the intrudability of the pellet was measured on the basis of the reduction amount per unit time of the pellet and was verified to be constant. The shape of the specimen was varied according to the following evaluation items. Specifically, a No. 1 size dumbbell was prepared for the measurement of the modulus of elasticity, and a 100-mm square plate having a thickness of 5 mm was prepared for the falling impact test. The obtained pulp-dispersed polypropylene pellet, and the specimens were evaluated by the following methods.

(Aspect Ratio, and Length Proportion and Radial Proportion of Defibrated Portion)

The obtained pulp-dispersed polypropylene pellet was immersed in a xylene solvent for dissolving the polypropylene, and the remaining pulp fibers (fibrous filler) were observed with respect to the shapes of the fibers by using a SEM. Approximately 10 representative fibers were measured, and consequently, the fiber diameters were 2 to 10 μm, the fiber lengths were 200 to 1000 μm, and the aspect ratios of the undefibrated portions were 100 to 200. Defibrated portions were recognized at the fiber length direction ends of the fibers, the lengths of the defibrated portions were approximately 20 to 30% of the entire fiber lengths, and the fiber diameters in the defibrated portions were 100 to 1000 nm, and approximately 1/20 the fiber diameters of the undefibrated portions. From these values, the aspect ratios of the defibrated portions were determined.

(Pellet Shape)

The pulp fiber-dispersed polypropylene pellet was prepared by hot-cutting, the cut portions thereof were cut while the portions were being extended, and thus the shapes of the end faces were elliptical. In addition to this, the fibers tend to protrude from the surface of the pellet, and the presence of the fibers on the surface of the pellet was verified by using a microscope. By using a SEM, the interfaces between the fibers and the main ingredient resin in the pellet were observed, and it was verified that voids were present in a volume of 10% or less of the volume of the fibers.

(Modulus of Elasticity of Composite Resin Molded Body)

A tensile test was performed by using the obtained specimen having the No. 1 dumbbell shape. The evaluation method of the modulus of elasticity was such that the case where the value of the modulus of elasticity was less than 1.8 GPa was evaluated as "Poor," the case where value of the modulus of elasticity was 1.8 GPa or more and less than 2.0 GPa was evaluated as "average," and the case where the value of the modulus of elasticity was 2.0 GPa or more was evaluated as "good." The modulus of elasticity of the aforementioned specimen was 2.2 GPa, and the evaluation of the specimen was "good."

(Falling Impact Test of Composite Resin Molded Body)

A falling impact test was performed by using the obtained plate-shaped specimen. Specifically, a steel ball having a weight of 300 g was allowed to fall from a height of 100 cm against the plate surface of the specimen, and it was verified whether or not the specimen cracked. The evaluation method of the falling impact test was such that the case where no crack(s) was found was evaluated as "good," the case where a crack(s) was found only on the surface and the length of the crack was less than 10 mm was evaluated as "average," and the case where a penetrating crack(s) was found or the length of the crack was 10 mm or more was evaluated as "poor." The aforementioned specimen was free from cracks and was evaluated as "good."

(Moldability)

When the intrudability (intrusion stability) of the pellet into the kneader of the molding apparatus was poor, the resin amount fed during molding is varied, and the moldability is also degraded. Accordingly, the moldability of the composite resin molded body was evaluated on the basis of the intrudability. Specifically, the case where the variation of the reduction amount of the pellet per unit time was less than 10% when the pellet was fed to the molding apparatus was evaluated as "good," and the case where the aforementioned variation was 10% or more was evaluated as "average." In Example 1, the variation of the reduction amount of the pellet per unit time was less than 10%, and accordingly the moldability of Example 1 was "good."

Example 2

As compared with Example 1, the screw constitution in the kneader was altered to a low shear type. On the other hand, the conditions other than the screw constitution were the same as in Example 1, and a pulp-dispersed polypropylene pellet, and a molded body were prepared. The same evaluations as in Example 1 were performed.

Example 3

As compared with Example 1, the screw constitution in the kneader was altered to a high shear type. On the other hand, the conditions other than the screw constitution were the same as in Example 1, and a pulp-dispersed polypropylene pellet, and a molded body were prepared. The same evaluations as in Example 1 were performed.

Example 4

As compared with Example 1, the fibrous filler was altered to a jute fiber obtained from a hemp raw material. On the other hand, the conditions other than that were the same as in Example 1, and a jute fiber-dispersed polypropylene pellet, and a molded body were prepared. The same evaluations as in Example 1 were performed.

Example 5

As compared with Example 1, the preparation method of the pellet was altered to the method of hot-cutting in water. On the other hand, the conditions other than that were the same as in Example 1, and a pulp-dispersed polypropylene pellet, and a molded body were prepared. The same evaluations as in Example 1 were performed.

Example 6

As compared with Example 1, the preparation method of the pellet was altered to the strand cutting method in which the resin melt was turned into a strand shape, and the strands were water cooled and cut with a pelletizer. On the other hand, the conditions other than that were the same as in Example 1, and a pulp-dispersed polypropylene pellet, and a molded body were prepared. The same evaluations as in Example 1 were performed.

Example 7

As compared with Example 1, the softwood pulp was completely hydrophobically modified with a silane coupling agent so as to be a pulp fiber compatible with polypropylene. On the other hand, the conditions other than that were the same as in Example 1, and a pulp-dispersed polypropylene pellet, and a molded body were prepared. The same evaluations as in Example 1 were performed.

Example 8

As compared with Example 1, the conditions were altered in such a way that maleic anhydride as a dispersant was not added. On the other hand, the conditions other than that were the same as in Example 1, and a pulp-dispersed polypropylene pellet, and a molded body were prepared. The same evaluations as in Example 1 were performed.

Comparative Example 1

As compared with Example 1, the screw constitution in the kneader was altered to a conveying screw substantially free from shear. On the other hand, the conditions other than the screw constitution were the same as in Example 1, and a pulp-dispersed polypropylene pellet, and a molded body were prepared. The same evaluations as in Example 1 were performed.

Comparative Example 2

As compared with Example 1, the screw constitution of the kneader was altered to a high shear type. On the other hand, the conditions other than the screw constitution were the same as in Example 1, and a pulp-dispersed polypropylene pellet was prepared. The obtained pellet was again placed in the kneader, and a pulp-dispersed polypropylene pellet was prepared. This operation was repeated in such a way that the pellet was made to pass through the kneader 10 times in total, and thus a pulp-dispersed polypropylene pellet was prepared. By using the thus prepared pellet, a molded body was prepared in the same manner as in Example 1. The same evaluations as in Example 1 were performed.

Comparative Example 3

As compared with Example 1, the softwood pulp was altered to a hardwood pulp. On the other hand, the conditions other than the pulp type were the same as in Example 1, and a pulp-dispersed polypropylene pellet, and a molded body were prepared. The same evaluations as in Example 1 were performed.

Comparative Example 4

As compared with Example 1, an alteration was introduced in such a way that a wet defibration treatment was preliminarily applied to the softwood pulp, and thus a pulp fiber undergoing a more advanced fiber defibration was obtained. On the other hand, the conditions other than that were the same as in Example 1, and a pulp-dispersed polypropylene pellet, and a molded body were prepared. As for the evaluation, the same evaluations as in Example 1 were performed.

Comparative Example 5

As compared with Example 1, an alteration was introduced in such a way that a rubber fiber was adopted as the fibrous filler. On the other hand, the conditions other than that were the same as in Example 1, and a pulp-dispersed polypropylene pellet, and a molded body were prepared. The same evaluations as in Example 1 were performed.

Comparative Example 6

As compared with Example 1, an alteration was introduced in such a way that a glass fiber was adopted as the fibrous filler. On the other hand, the conditions other than that were the same as in Example 1, and a pulp-dispersed polypropylene pellet, and a molded body were prepared. The same evaluations as in Example 1 were performed.

Table 1 shows the evaluation results of Examples 1 to 8 and Comparative Examples 1 to 6.

TABLE 1

| | Fibrous filler | | | | | Main ingredient resin | |
|---|---|---|---|---|---|---|---|
| | Type | Modulus of elasticity [GPa] | Aspect ratio of defibrated portion | Length proportion of defibrated portion | Diameter ratio of defibrated portion | Type | Modulus of elasticity [GPa] |
| Example 1 | Cellulose (softwood) | 6 | 100 to 200 | 20 to 30% | 1/20 | PP | 1.5 |
| Example 2 | Cellulose (softwood) | 6 | 5 to 20 | 5 to 10% | 1/10 | PP | 1.5 |
| Example 3 | Cellulose (softwood) | 6 | 900 to 1000 | 40 to 50% | 1/50 | PP | 1.5 |
| Example 4 | Cellulose (hemp) | 20 | 100 to 200 | 20 to 30% | 1/20 | PP | 1.5 |
| Example 5 | Cellulose (softwood) | 6 | 100 to 200 | 20 to 30% | 1/20 | PP | 1.5 |
| Example 6 | Cellulose (softwood) | 6 | 100 to 200 | 20 to 30% | 1/20 | PP | 1.5 |
| Example 7 | Cellulose (softwood) | 6 | 100 to 200 | 20 to 30% | 1/20 | PP | 1.5 |
| Example 8 | Cellulose (softwood) | 6 | 100 to 200 | 20 to 30% | 1/20 | PP | 1.5 |
| Comparative Example 1 | Cellulose (softwood) | 6 | 100 to 200 | 0 to 4% | 1/20 | PP | 1.5 |
| Comparative Example 2 | Cellulose (softwood) | 6 | 100 to 200 | 80 to 100% | 1/50 | PP | 1.5 |
| Comparative Example 3 | Cellulose (hardwood) | 6 | 100 to 200 | 20 to 30% | 1/5 | PP | 1.5 |
| Comparative Example 4 | Cellulose (softwood) | 6 | 1000 to 2000 | 40 to 50% | 1/10 | PP | 1.5 |
| Comparative Example 5 | Rubber | 0.001 | 5 to 20 | 0% | 1/1 | PP | 1.5 |
| Comparative Example 6 | Glass | 68 | 5 to 20 | 0% | 1/1 | PP | 1.5 |

| | Pellet | | | Composite resin molded body | | |
|---|---|---|---|---|---|---|
| | End face shape | Fiber protrusion | Void percentage | Modulus of elasticity [GPa] | Falling impact test | Moldability |
| Example 1 | Ellipse | Found | 10% or less | 2.2 | Good | Good |
| Example 2 | Ellipse | Found | 10% or less | 2.2 | Good | Good |
| Example 3 | Ellipse | Found | 10% or less | 2.1 | Good | Good |
| Example 4 | Ellipse | Found | 10% or less | 2.5 | Good | Good |
| Example 5 | Ellipse | None | 10% or less | 2.1 | Good | Average |
| Example 6 | Circle | Found | 10% or less | 2.1 | Good | Average |
| Example 7 | Ellipse | Found | No Voids | 2.1 | Good | Average | Good |
| Example 8 | Ellipse | Found | 70% | 1.8 | Average | Good | Good |
| Comparative Example 1 | Ellipse | Found | 10% or less | 1.7 | Poor | Good |
| Comparative Example 2 | Ellipse | Found | 10% or less | 2.1 | Good | Poor | Good |
| Comparative Example 3 | Ellipse | Found | 10% or less | 1.7 | Poor | Good |
| Comparative Example 4 | Ellipse | Found | 10% or less | 2.1 | Good | Poor | Good |
| Comparative Example 5 | Ellipse | Found | 10% or less | 1.4 | Poor | Good |
| Comparative Example 6 | Ellipse | Found | 10% or less | 2.3 | Good | Poor | Good |

As can be seen from Table 1, in Example 2 in which the screw constitution was altered to a low shear type, the fibers were not sufficiently defibrated in the molten resin, and consequently, the length proportions of the defibrated portions were 5 to 10%, the diameters of the defibrated portions were approximately 1/10 the diameters of the entire fibers, and the aspect ratios of the defibrated portions were 5 to 20. On the contrary, in Example 3 in which the screw constitution was altered to a high shear type, the fibers were well defibrated in the molten resin, the length proportions of the defibrated portions were 40 to 50%, the diameters of the defibrated portions were approximately 1/50 the diameters of the entire fibers, and the aspect ratios of the defibrated portions were 900 to 1000. Example 2 and Example 3 were both verified to be free from problems with respect to the modulus of elasticity, the impact test, and the moldability, in the same manner as in Example 1. It has also been verified that a highly reinforced resin is obtained when the length proportions of the defibrated portions are 5 to 50%, the diameters of the defibrated portions were approximately 1/10 or less the diameters of the entire fibers, and the aspect ratios of the defibrated portions were 5 to 1000. Moreover, even in Example 4 adopting, as the fibrous filler, a jute fiber obtained from a hemp raw material, the modulus of elasticity, the impact test, and the moldability were free from problems, in the same manner as in Example 1. In Example 4, it has also been verified that because the difference of the modulus of elasticity between the resin and the fiber is within 20 GPa, the impact resistance is free from problems, and a highly reinforced resin is obtained.

On the contrary, in Comparative Example 1 in which the screw constitution was altered so as to involve only a conveying screw substantially free from shear, a partial defibration of the pulp was not substantially performed, and the length proportions of the defibrated portions were 0 to 4%. Accordingly, the modulus of elasticity of the composite resin molded body was decreased to 1.7 GPa, and consequently the strength of the molded body was decreased.

In Comparative Example 2 in which the screw constitution was altered to a high shear type, and the pellet was made to pass through the kneader 10 times in total, the defibration of the pulp was considerably promoted, and the length proportions of the defibrated portions were 80 to 100%. Accordingly, the fibers tended to be oriented during the injection molding, cracks were generated in the falling impact test, and consequently the impact resistance was degraded.

In Comparative Example 3 in which the softwood pulp was altered to a hardwood pulp, the defibration under the application of the same shear force was varied, and the diameters of the defibrated portions were approximately 1/5 the diameters of the entire fibers. Accordingly, the decrease of the modulus of elasticity was caused, and consequently the strength was decreased to be 1.7 GPa.

In Comparative Example 4 in which pulp fibers advanced in the defibration of the fibers by preliminarily applying a wet defibration treatment to a softwood pulp, the aspects ratios of the defibrated portions were as large as 1000 to 2000. Accordingly, the fibers were easily oriented during injection molding, cracks were generated in the falling impact test, and consequently the impact resistance was decreased.

In Comparative Example 5 in which the fibrous filler was altered to a rubber fiber, the modulus of elasticity of the rubber was 0.001 GPa to be lower than the modulus of elasticity of the polypropylene of the main ingredient resin. Consequently, the modulus of elasticity was decreased to be 1.4 GPa.

In Comparative Example 6 in which the fibrous filler was altered to a glass fiber, the modulus of elasticity of the glass was 68 GPa to be larger by 20 GPa or more than the modulus of elasticity of the polypropylene, the main ingredient resin. Accordingly, the stress tended to be concentrated in the interface between the resin and the fibers at the time of the occurrence of impact, thus cracks are generated in the falling impact test, and consequently impact resistance was degraded.

In Example 5 in which the preparation method of the pellet was altered to the method of hot-cutting in water, because the molten resin was rapidly cooled, a viscosity gradient occurred in the pellet, the fibers easily moved toward the inside lower in viscosity, and a state occurred in which no fibers were found on the surface of the pellet. Consequently, it was difficult for the individual pellets to interfere with each other during the molding, the intrudability was degraded, the productivity was hardly stabilized, and as a result, the moldability was slightly degraded as compared with other Examples. On the other hand, the modulus of elasticity and the impact test did not involve any problems.

In Example 6 in which the pellet preparation method was altered to a method in which the resin melt was turned into a strand shape, and then the strands were water cooled and cut with a pelletizer, the columnar strands having circular cross sections were prepared and cut after cooling, and consequently the shapes of the end faces of the pellet were planar. Accordingly, the pellet rolled on the screws during molding, the intrudability was degraded, the productivity was hardly stabilized, and consequently the moldability was slightly degraded as compared with other Examples. On the other hand, the modulus of elasticity and the impact test did not involve any problems.

In Example 7 in which the softwood pulp was completely hydrophobically modified with a silane coupling agent so as to be a pulp fiber compatible with polypropylene, the compatibility between the fibrous filler and the polypropylene was increased to create a state including no voids around the fibrous filler. Accordingly, the stress tended to be concentrated in the interface between the resin and the fibers at the time of the occurrence of impact, and consequently the impact resistance was slightly degraded as compared with other Examples. However, as compared with Comparative Examples 1 to 6, Example 7 was better in the modulus of elasticity and the impact test.

In Example 8 in which maleic anhydride as a dispersant was not added, the fibrous filler and the polypropylene were not compatible with each other, and the volume of the voids around the fibrous filler was approximately 70% of the volume of the fibrous filler. Consequently, the modulus of elasticity was slightly degraded as compared with other Examples. However, as compared with Comparative Examples 1 to 6, Example 8 was better in the modulus of elasticity and the impact test.

As was found from the aforementioned evaluations, by preparing a molded body by using a resin pellet in which only the ends of the fibrous filler added in the composite resin composition are defibrated, a high modulus of elasticity can be actualized even when the aspect ratio of the fibrous filler is not so high. As was also found from the aforementioned evaluations, when the aspect ratio of the fibrous filler is not high, the fibers are hardly oriented during injection molding, and it is possible to provide a composite resin pellet capable of actualizing a composite resin molded body high in surface impact strength. As was also found from the aforementioned evaluations, when the fibers are present on the surface of the composite resin pellet, and the pellet end faces are the elliptical, the intrudability of the pellet into the molding machine is good, and thus the moldability is good.

The composite resin composition according to the present invention can provide a molded body better in mechanical strength than the molded bodies prepared from conventional general-purpose resins. The present invention can improve the properties of the main ingredient resin, and the composite resin composition according to the present invention can be used as a substitute for engineering plastics or as a substitute for metal materials. Accordingly, it is possible to drastically reduce the production costs of various industrial products made of engineering plastics or metals, or living goods. Moreover, the composite resin composition according to the present invention can be used for enclosures of household electric appliances, building materials and automobile components.

REFERENCE SIGNS LIST

1 main ingredient resin
2 fibrous filler
3 defibrated portion

What is claimed is:

1. A composite resin composition suitable as a raw material for a molded article produced by a molding machine, and comprising a matrix resin and a fibrous filler,
   wherein the fiber length direction end of the fibrous filler is defibrated;
   the length of the defibrated portion is 5% or more and 50% or less of the fiber length of the entire fibrous filler;
   the fiber diameter in the defibrated portion of the fibrous filler is $1/1000$ or more and $1/10$ or less the fiber diameter in the undefibrated portion;
   the modulus of elasticity of the fibrous filler is higher than the modulus of elasticity of the matrix resin, and the difference between these moduli of elasticity is within 20 GPa, and
   voids are present in the composite resin composition at an interface between the resin and the fibrous filler, and the volume of the voids is 3% or more and 10% or less of the volume of the fibrous filler.

2. The composite resin composition according to claim 1, wherein the fibrous filler is a natural fiber made of cellulose.

3. The composite resin composition according to claim 1, wherein the matrix resin is an olefin resin.

4. A pellet comprising the composite resin composition according to claim 1.

5. The pellet according to claim 4, wherein the fibrous filler partially protrudes from the surface of the pellet.

6. The pellet according to claim 4, wherein at least either one of the end faces thereof shows an elliptical shape.

7. The composite resin composition according to claim 1, wherein the voids are present in an amount sufficient to provide increased impact resistance for the composition relative to a composition where the voids are absent.

8. The composite resin composition according to claim 1, wherein the fibrous filler is obtained from hemp or softwood.

* * * * *